United States Patent
Scholz

[11] 3,921,880
[45] Nov. 25, 1975

[54] MULTIPURPOSE AUDIO-VISUAL CASSETTE WITH ISOLATION LOOP

[75] Inventor: Donald T. Scholz, Watertown, Mass.

[73] Assignee: Polaroid Corporation, Cambridge, Mass.

[22] Filed: July 2, 1974

[21] Appl. No.: 485,219

Related U.S. Application Data

[62] Division of Ser. No. 374,507, June 28, 1973, Pat. No. 3,850,512.

[52] U.S. Cl. ............................ 226/181; 354/321 X
[51] Int. Cl.² ...................................... B65H 17/22
[58] Field of Search ............ 226/184, 181; 354/319, 354/320, 321

[56] References Cited
UNITED STATES PATENTS

| | | |
|---|---|---|
| 1,927,886 | 9/1933 | Burns .............................. 354/321 X |
| 2,097,059 | 10/1937 | Ensign ............................ 354/320 X |
| 2,305,011 | 12/1942 | Kienninger ..................... 354/319 X |
| 3,697,017 | 10/1972 | Adams ............................. 226/181 X |

Primary Examiner—Richard A. Schacher
Attorney, Agent, or Firm—David L. Thornton

[57] ABSTRACT

Sound recording and playback photographic apparatus for driving and guiding a strip of photographic film along a given path. The film strip is disposed around a first roller configured only to engage the film strip's outer edges, and a second roller is mounted for selective displacement from a position spaced from the film strip into a position wherein it engages the film strip and presses it against the first roller. The displacably mounted second roller is actuated by a drive disassociated from the first roller to cause the film strip to be advanced between the two rollers.

2 Claims, 4 Drawing Figures

MULTIPURPOSE AUDIO-VISUAL CASSETTE WITH ISOLATION LOOP

This application is a division of application Ser. No. 374,507, filed on June 28, 1973 now U.S. Pat. No. 3,850,512.

BACKGROUND OF THE INVENTION

The present application is directed to film advance apparatus particularly useful in connection with photographic film cassettes from which the film strip need not be removed during the exposure, processing, and projection operations and, more particularly, to film cassettes of the type which include internally programmed film processing systems. Exemplary of such systems are those described in the commonly assigned copending patent application Ser. No. 227,092 of John F. Batter, Jr. et al., filed Feb. 17, 1972 and now U.S. Pat. No. 3,785,727. As described in the copending application, a motion picture system has been devised by which a supply of photographic film contained in a cassette can be exposed in a camera adapted to receive the cassette and then processed, or developed, to provide the conventional series of transparent image frames in accordance with the transport of the film strip in a predetermined program.

It has been recently proposed that the film strip, in addition to carrying a photosensitive area, carry a portion of magnetic sound tape affixed to or formed as a part thereof. Such film strip and magnetic tape combinations have been marketed for motion picture cameras and projectors and are commonly used within the photographic art. Whether such films have the magnetic tape affixed to it or formed as a part of it, recording may be carried out in either the camera or, subsequent to exposure, in a projector type arrangement in which "fill-in" or background comments are provided. When sound recording and playback occurs, both a magnetic transducer head and a constant speed drive capstan must be introduced through the cassette structure in order to contact the magnetic tape portion of the film strip. A constant speed drive capstan is employed for moving the film strip and magnetic tape past the transducer head at a constant speed — a requirement imposed by the latter. In contra-distinction to the constant speed drive of the capstan is the incremental motion imparted to the film strip by the sprocket drive mechanism of the camera and the projector. Such mechanisms generally take the form of a claw which pulls the film from sprocket holes on one or both sides of the film strip. As previously suggested, such mechanisms move the film strip along the given path of travel in a motion which is not unlike a flutter or twitch.

It should become apparent that such "jerky" motion be isolated from the transducer head in order to insure the proper audio quality desirable in motion picture sound systems. In order to isolate the claw motion from the transducer head, it is necessary to provide a motion absorbing arrangement within the film cassette per se. One way of accomplishing this is to locate a loop within the film strip between the claw and the transducer head. While this procedure is easily performed within an open film reel and projector, it is not so easily performed within a closed and contained self-developing film handling cassette structure in which such a loop must be selectively formed during some operations and should not during others.

SUMMARY OF THE INVENTION

A preferred embodiment of the present invention comprises a unique, compact, multi-purpose motion-picture-film-handling cassette in which the film strip is permanently retained during exposure, processing, sound recording, sound playback, projection and edition operations. More particularly, the present invention is addressed to a film advance arrangement particularly useful in connection with a motion-picture-film-handling cassette which aids and encourages the automatic formation of a loop within the film strip at a specific location within the cassette during select portions of the various operations for isolating the incremental movement of the conventional film claw from the magnetic tape transducer head which is responsible for the sound recording and playback operations and which necessitates a constant speed for its associated magnetic tape. The loop is formed between the claw mechanism and the transducer head for isolating the movement of the former from the latter. Additionally, the loop is positioned relative to the transducer head so as to provide the longest "run" of magnetic tape past the head, thereby helping to produce a constant magnetic tape speed. It will also be appreciated that both the location and operation of the film loop are critical to the overall system in which the cassette is used. Advantageously, the invention comprises a displaceably mounted capstand drive that selectively engages the film against a film guide roller.

The principal object of this invention, therefore, is to provide an improved film drive and guiding arrangement for sound recording and playback photographic apparatus.

Other objects of the invention will in part be obvious and will in part become apparent to those skilled in the art as the following description proceeds. The features of novelty which characterize the invention will be pointed out with particularity in the claims annexed to and forming part of the specification.

BRIEF DESCRIPTION OF THE DRAWINGS

For a fuller understanding of the nature and objects of the invention, reference should be made to the following detailed description taken in conjunction with the accompanying drawings wherein.

DETAILED DESCRIPTION OF THE PREFERRED EMBODIMENTS

Figure 1:
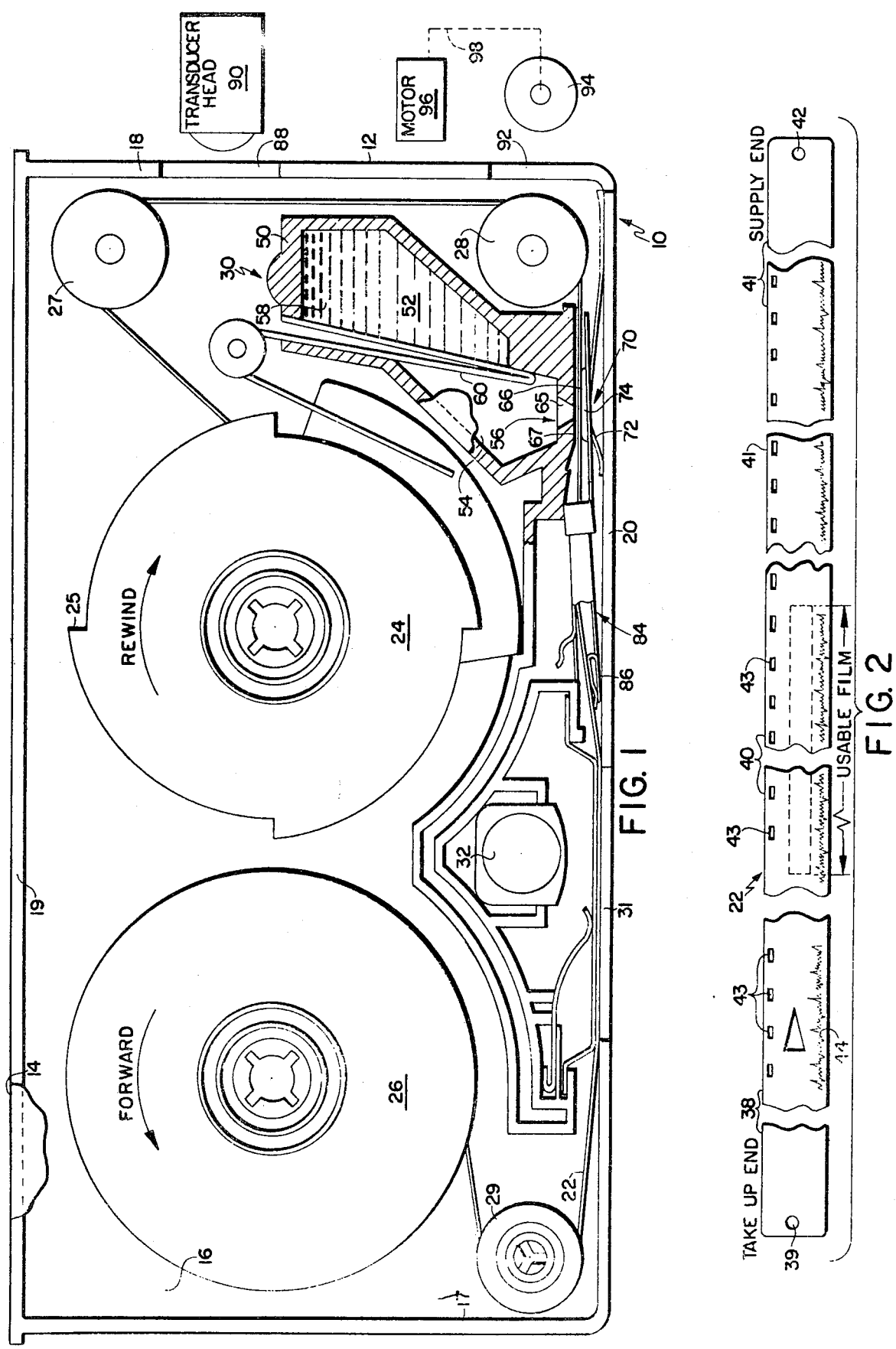
FIG. 1 is a diagrammatic view of a photographic film handling cassette incorporating the present invention.

The illustrated embodiment of this invention, which may be best understood by first referring to FIG. 1 of the drawings, employs a multipurpose film handling cassette 10 of the type described in the above-mentioned copending patent application which is configured for substantially automatic processing of the film strip responsive to appropriate transport of the latter within the cassette. As shown in FIG. 1, the cassette 10 comprises a generally parallelepiped casing or housing 12 constituted by planar faces or side walls 14 and 16, end walls 17 and 18, and elongated top and bottom edge walls 19 and 20. Carried within the housing 12 is a photographic film strip which is permanently attached at one of its ends to a rotatable supply spool or reel 24 from which it extends within the casing 12, in a somewhat extended path around suitable rollers generally designated at 27, 28 and 29, to a take-up spool or reel 26 to which the opposite end of the film is attached. In its path within the casing 12, the film 22 extends past a normally inoperative film processing station 30, which is subsequently explained in detail, and across an opening 31 which functions at different times to facilitate both exposure and projection. For facilitating the latter operation, a prism 32 is mounted behind the film strip 22 and in adjoining relation to both the opening 31 and to an illumination aperture (not shown) of the side wall 14.

In the illustrated embodiment, the processing operation is substantially controlled by the film transport program to which the cassette is subjected. This is accomplished, as later explained in detail, by utilizing one of the film spools and the film strip itself to provide both information and energy to the processing station 30 of the cassette. Consequently, the photographic film strip 22 is designed to cooperate with operational elements of the processing system, and preferably comprises a base of any suitable transparent material carrying at least over the central portion thereof, an emulsion of photosensitive coating of any conventional variety as, for example, an emulsion developed by a monobath processing composition to form a positive transparency suitable for projection.

Figure 2:
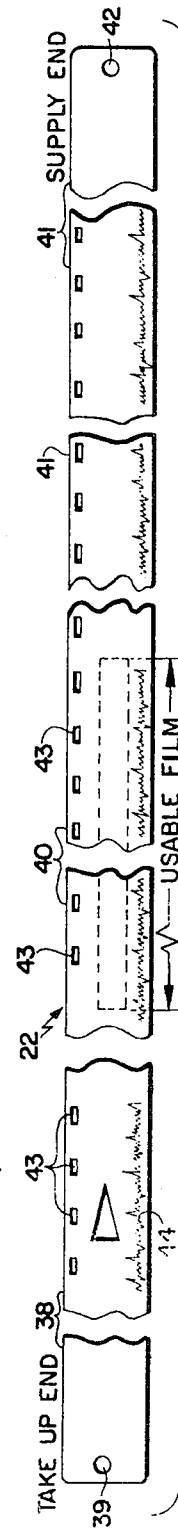
FIG. 2 is a fragmentary plan view of the film strip employed in the cassette shown in FIG. 1.

In this arrangement, the film strip 22 which is illustrated in FIG. 2 as viewed from the exterior side of the film strip as shown in FIG. 1, comprises a leader 38 terminating at an end formed with an aperture 39 which serves to connect that end of the film to the take-up spool 26. Behind the leader 38 is a strip 49 of photographically useful film upon which projectable images may be formed. Following the photographically useful portion 40 is a trailer region generally designated at 41, which carries at its ends an aperture 42 by which that end of the film is configured for connection to the supply spool 24.

Carried along one edge of the film strip 22 are a plurality of conventional sprocket holes 43 which are configured for cooperation with a drive pawl (not shown) in either a camera or projector for incremental advancement of the film. Adjacent the trailing end 41, the series of sprocket holes 43 are interrupted by a series of elongated sprocket holes (not shown). As may be seen in FIG. 2 of the drawings, the film strip 22 includes a magnetic soundtrack 44 provided in the vicinity of one edge thereof and which is adapted to have sound information first recorded thereon and then subsequently extracted therefrom.

As described in the aforementioned copending patent application, one elongated sprocket hole terminates the advance of the film in the camera (not shown) and thereby establishes an exposure end point, whereas another elongated sprocket hole determines a film take-up or projection point in the projection apparatus (not shown). These different termination points are employed since it is preferred to advance the film beyond the exposure end point to facilitate application of the processing composition to the exposed film, and for that purpose a double film drive pawl (not shown) is employed in the projector apparatus whereby the film may be carried beyond the first elongated hole until the second elongated hole is encountered.

Referring again to FIG. 1, a film processing station 30 generally comprises a housing 50 having a first compartment or receptacle 58 retaining a source of processing composition or fluid 52 which in accordance with operation of tear-tab 60 is adapted to release the fluid to a second compartment 54 which includes a coating nozzle generally designated at 56. The latter includes a nozzle opening 65 which extends from the compartment 54 to a film engaging surface 67 of the nozzle which is configured for depositing a layer (not shown) of controlled thickness of the processing fluid on the film strip 22 during tansport of the latter towards the supply spool 24, or that is, in its rewind direction. Deposit of suitable layer of the fluid 52 is facilitated by a doctor blade element 66 which is depressed slightly below the film engaging surface 67 and which in cooperation with the latter and a pressure pad which applies a substantially uniform coating of fluid on the film strip 22. Hence, the surface 67 in effect provides means for spacing the film strip from the nozzle opening 65 and the doctor blade 66.

Mounted beneath the applicator housing 50 is a pressure pad assembly 70, which is shown in FIG. 1 in the initial position assumed by it upon assembly of the cassette and prior to processing of the film strip 22. As shown therein, the strip 22 normally passes between the nozzle surface 67 and a raised film engaging surface 74 of the pad assembly 70. The latter is mounted on and biased towards the nozzle surface 67 by a leaf spring 72.

The pad assembly 70, as subsequently explained, is designed for displacement along the film path between an initial, inoperative position shown in FIG. 1 wherein its pad surface 74 is held away from the processor nozzle and an operative position, shown in FIG. 4, wherein its pad surface sandwiches the interviewing portions of the film strip 22 against the nozzle land 67.

A wedge-like slide valve 84, shown in FIG. 1, is displaceably mounted in adjoining relation to a leading end of the pad assembly 70 and is configured to be displaced into blocking engagement with the nozzle 65 upon completion of the processing operation. In this arrangement, the slide valve 84 carries a downwardly extending arm 86 which, at the end of the rewind operation, is configured to carry the valve to the right from the position shown in FIG. 1. This displacement forces the valve 84 into blocking engagement with the nozzle opening 65. For a more detailed description of the processing and equipment and operation, reference should be made to a copending application for U.S. Patent, Ser. No. 262,044, entitled "Photographic Apparatus Having An Improved Film Operated Processing System," by Gerald H. Cook, filed June 6, 1972 and now U.S. Pat. No. 3,724,086 and assigned to the assignee of the present application.

A plurality of apertures are located in cassette 10 for facilitating the introduction of an audio system into operable association with the magnetic tape portion 44 of film strip 22. A first aperture 88, located in end wall 18, permits a magnetic recording and playback transducer head shown generally at 90 to enter cassette 10 and contact the magnetic tape portion 44 of film strip 22. Transducer head 90 and its associated structure is claimed and described in detail in a copending application for U.S. Patent, Ser. No. 374,657 filed June 28, 1973 and assigned in common herewith. A pressure plate (not shown) is located within cassette 10 behind film strip 22 for insuring the proper engagement pressure and alignment between transducer head 90 and magnetic tape portion 44 of film strip 22. A second aperture 92 is provided at the lower right hand corner of cassette 10 (as viewed in FIG. 1) for permitting the introduction of a constant speed drive capstan 94 into cassette 10 proximate idler 28. Constant speed drive capstan 94 is driven, in turn, by a constant speed motor 96 via appropriate linkages shown generally by dashed line 98. Capstan 94 is formed as a portion of a large flywheel (not shown) for insuring the relative unvariability of its speed. A constant speed drive for the magnetic tape (and film strip) must be provided in order to insure the proper audio quality desired in motion picture sound systems and is obvious to those skilled in the art. It should also be noted that both transducer head 90 and capstan 94 are selectively movable into and out of engagement with film strip 22 and magnetic tape portion 44 during the various operations performed in the camera and projector described above. The specific structure and mechanism for moving both capstan 94 and transducer head 90 into engagement with film strip 22 and the magnetic tape 44 is claimed and described in a copending application for U.S. Patent, Ser. No. 374,578 filed June 28, 1973 and now U.S. Pat. No. 3,848,977.

Figure 3:
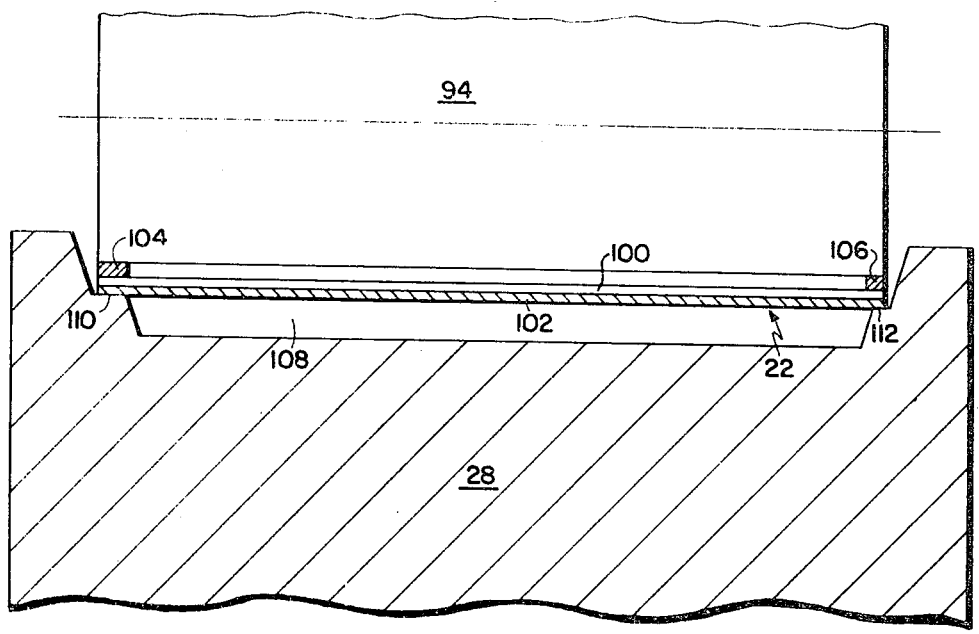
FIG. 3 is a fragmentary cross-sectional view of two elements employed in the cassette shown in FIG. 1.

Looking to FIG. 3, there is shown a detailed view of the engagement between idler 28, film strip 22, and capstan 94 when the latter is moved into contact with the former. As may be best seen in FIG. 3, film strip 22 is formed having a support layer 100, an emulsion layer 102, and a pair of long narrow strips or rails 104 and 106 located on each lateral edge of the film strip and extending the full length thereof. For reasons of simplicity, all of the various image bearing layers and color layers, etc., have been combined in the emulsion layer 102. The specific structure and operation of the film strip 22 may be found in a number of U.S. Patents, for example, U.S. Pat. No. 3,536,488 issued Oct. 27, 1970 and U.S. Pat. Nos. 3,615,426; 3,615,427; 3,615,428; and 3,615,429; issued Oct. 26, 1971, respectively. Rails 104 and 106 are located on film strip 22 for providing an air space between the emulsion layer 102 and the support layer 100 when the wet film strip is wound up on supply reel 24 directly after the processing operation. If rails 104 and 106 were not provided, the emulsion side of the film strip might possibly stick to the support layer of the next wind and impair or damage the development of the photographic image. The film strip 22 is so wound within cassette 10 such that rails 104 and 106 are directed outwardly as film strip 22 passes between idler 27 and 28. Consequently, idler 28 is formed having a centrally depressed area 108 and two stepped portions 110 and 112 proximate the lateral edges of film strip 22. Configured as such, the wet emulsion layer 102 of film strip 22 is isolated from contact with idler 28 by the depressed area 108. The outer edges of film strip 22 which are in contact with stepped portions 110 and 112 are not coated with the developing liquid and such contact does not affect the quality of the film strip or its image.

Capstan 94, when moved into engagement with film strip 22 and, indirectly, idler 28, contacts or engages only the rails 104 and 106 of film strip 22 and does not directly contact idler 28. Moreover, capstan 94, the exterior of which is polyurethane coated, drives the film strip 22 and not the idler 28. It is important to note that by driving film strip 22 directly from capstan 94, film strip 22 may be more easily guided by idler 28 than if capstan 94 drove idler 28 which drove film strip 22. Idler 28 is a much more effective guide roller when it is a non-driven roller than when it is being directly driven. Correct guiding of film strip 22 is most important when it is considered that the magnetic tape portion is being carried thereon, and specifically, on the top of the non-sprocketed rail 106. Moreover, the relative proximity of idler 28 to transducer head 90 requires that both the magnetic tape and the film strip be guided within exacting tolerance levels. Accordingly, the configuration and arrangement of the capstan, idler and film strip serve to not only isolate the wet emulsion side of the film from contact with idler 28 but additionally serve to provide a more efficient manner of guiding the film strip 22 while it is in close proximity to the magnetic transducer head 90.

The specific manner in which film strip 22 is moved during exposure, projection, etc., has been previously discussed. Specifically, a claw type mechanism (not shown) is employed for moving film strip 22 from supply reel 24 to take-up reel 26. The claw mechanism utilizes sprocket holes 43 provided in film strip 22 in a conventional manner well known in the motion picture field. It is important to note, however, that the motion imparted to the film strip 22 by the claw mechanism is incremental. That is, film strip 22 is moved in small jerky steps due to the distance between the individual sprocket holes 43. The physical distance of each step corresponds to the physical distance between the sprocket holes contained in film strip 22. While such incremental motion may be adapted for visual projection with a camera or projector, it is not easily adapted to an audio system which requires the associated magnetic tape to pass through at a constant speed. Specifically, if the magnetic tape is passed by the magnetic tape transducer head 90 in small incremental steps, the sound quality of the audio system will be drastically reduced by wow and flutter. Accordingly, the incremental motion of the advancing claw mechanism must be isolated from the transducer head 90 in order to achieve the degree of audio quality desirable in such motion picture systems.

In order to achieve this isolation, conventional motion picture and audio systems utilize a loop formed in the film unit and sound track for isolating the jerky motion of the claw mechanism from the magnetic tape head. While such loops work very well within the conventional systems, the loops utilized during projection must be manually formed by the operator during the winding of the film upon and within the projector. The present motion picture film-handling cassette is an independent unit in which the film strip remains within the cassette during exposure, development and projection. Accordingly, the use of manually formed loops within the cassette for isolating the motion of the claw mechanism from the magnetic transducer head is not a viable possibility. Any film loop which is incorporated within the present cassette structure must be automatically formed by the cassette structure itself in conjunction with the associated sound equipment.

Figure 4:
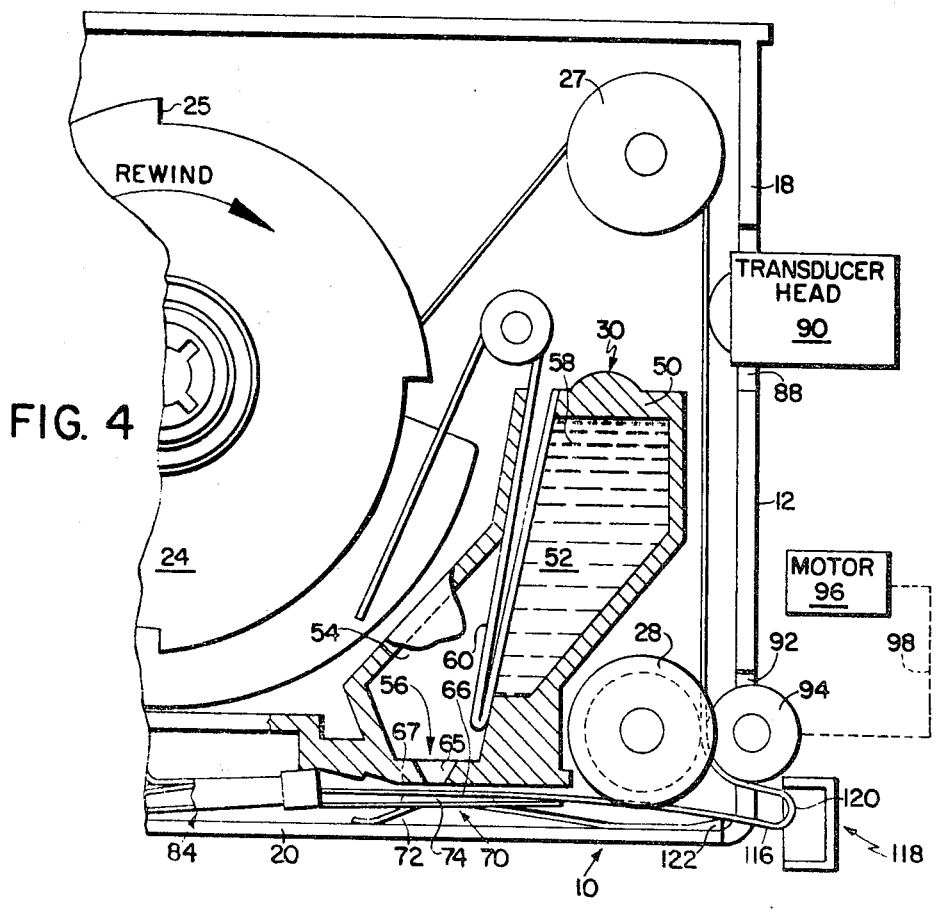
FIG. 4 is a fragmentary plan view of the film handling cassette of FIG. 1 during another configuration of the cassette.

Looking to FIG. 4, there is shown a portion of the cassette structure including the structure for automatically forming an isolation loop between the claw mechanism (not shown) and the magnetic tape transducer head 90. The isolation loop of the present invention is automatically formed whenever the transducer head 90 is moved into engagement with the magnetic tape portion 44 of film strip 22. Transducer head 90 engages the magnetic tape 44 during those operations of the camera, projector, etc., which require that sound be recorded, played back or erased. During all other operations, transducer head 90 is not in contact with the magnetic tape portion 44 and the isolation loop is not formed. As may be evidenced from FIG. 4, an isolation loop 116 is formed within film strip 22 proximate idler 28. Loop 116 is configured to extend around capstan 94 and through aperture 92 located at the corner of cassette 10. Positioned near loop 116 is an electric eye assembly 118 which notices when loop 116 increases in size beyond a certain point. The assembly 118 instructs the drive motor (not shown) of the claw mechanism to speed up should loop 116 get too large. It should be noted that loop 116 is free or unencumbered in its shape and form and is not retained in its status by supporting structure.

The isolation loop 116 is formed when constant speed capstan 94 is moved into contact with idler 28 and film strip 22. This engagement is best seen in FIG. 3. Constant speed capstan 94 starts to pull the film strip 22 past transducer head 90 at the constant speed required by the latter. Due to various factors, the film strip 22 begins to belly out at the corner of cassette 10 proximate idler 28 where the film strip 22 changes direction. It is into this bend in the film at idler 28 that capstan 94 drives film strip 22. Since the film strip 22 is driven into a bend by the capstan and is being withdrawn from a non-parallel direction, forces are presented which tend to promote the formation of the loop 116 at the point where it is bent. Additionally, various elements of the cassette, for example, the processing equipment and claw mechanism structure tend to set up retarding forces for the film strip which tend to produce an excess of film eventually located between the processing equipment and the bend in the film at idler 28. Due to these retarding forces and the fact that capstan 94 drives the film strip 22 into the bend at a faster rate than the claw mechanism can extract it, a loop is formed, at a location within the present embodiment proximate idler 28. Thus it can been seen that the cassette includes means which forms the loop. The processing equipment serves to constrict the lateral movement of the film strip 22 as it passes between idler 28 and aperture 31 more than it frictionally restricts its movement. The specific orientation is not unlike that of a film strip passing through a narrow channel which stops the film unit from "buckling" as it passes through the channel. Additionally, the cassette housing aids in the formation of the loop in its specific orientation shown. The claw mechanism (not shown) continues to operate at a normal speed pulling film strip 22 through the processing apparatus discussed above. The film loop 116 is increased in size until the outward edge 120 of the film loop 116 breaks through the electric eye 118. The appropriate sensing network (not shown) instructs the claw mechanism drive motor to take up the extra slack within the film loop by increasing the speed at which the claw mechanism pulls the film strip 22 toward the aperture 31. As a result of the increased speed, the film loop 116 decreases in size until its end 120 no longer interrupts the electric eye 118. It should be noted that free loop 116 absorbs the "shock" produced by the claw mechanism due to its incremental advancement of the film strip 22. On each successive pull of the claw mechanism, loop 116 is taken-up a small amount equal to the physical dimension between successive sprocket holes. In addition, capstan 94 continues to add more film to the loop 116 to make up for the take-up by the claw mechanism. As a result, a balance is struck between the pull of the claw mechanism and the push of the capstan to maintain the film loop 116 within certain size limits.

Located at the inward edge of aperture 92 is a ramped element 122. Formed of plastic or the like, ramped element 122 provides an entrance for the film loop 116 to re-enter cassette 10 which does not impede or damage the film strip as it enters the cassette. Additionally, ramped element 122 aids in the formation of loop 116 in the orientation shown in FIG. 4. In particular, ramped element 122 is engaged by the film strip 22 as it begins to belly out in the formation of loop 116. Element 122 lies in the direct path of movement of film strip 22 and directs the film unit toward aperture 92 through which loop 116 is formed. Ramped element 122 also serves to guide the film strip 22 into the nozzle area without producing sharp angles or corners by which the film strip might have to pass.

The roller 28 and the housing structure as at element 122 constrain the film strip 22 at the place where it is bent and begins to change direction. Moreover, this constraint located proximate the aperture through which the film strip is passed for guiding the loop as it passes through the cassette. Consequently, it will be seen that means are provided for guiding the film loop.

The specific construction and location of film loop 116 forms part of an important relationship between the incremental motion of the claw mechanism and the magnetic tape transducer head 90. Specifically, bottom wall 20 and ramped element 122 are so positioned relative to idler 28, capstan 94 and film strip 22 that loop 116 must be formed as shown in FIG. 4. In addition to providing an uncomplicated position in which it may be monitored by electric eye 118, film loop 116 provides a more efficient manner for absorbing the incremental motion of the claw mechanism, i.e., with the direction of movement of the claw mechanism take-up parallel to the long side of the film loop 116.

Subsequent to any recording or playback operation of the transducer head 90, both head 90 and capstan 94 are withdrawn from engagement with the magnetic tape 44 and film strip 22. As a result, the drive system for forming the film loop 116 ceases. The claw mechanism is now operative to take-up the full amount of slack contained within loop 116 and the film strip 22 assumes the winding status shown in FIG. 1. When transducer head 90 and capstan 94 are again moved into contact with the film strip 22, the isolation loop 116 is again formed.

While an independent transducer head and capstan have been disclosed, it is intended that the two audio system components may be included within a motion picture camera as well as a projector or viewer. While the audio system may be present in either or both, it should become apparent that the isolation film loop must be automatically formed by the cassette and audio system elements themselves.

It will be seen that by this invention there is provided an improved photographic cassette and photographic associated sound system for use therewith. Both the cassette and the sound system require different varieties of drive systems which are combined within the instant system without encroaching upon each other.

This invention may be practiced or embodied in various other ways without departing from the spirit or essential character thereof. The preferred embodiments described herein are therefore illustrative and not restrictive, the scope of the invention being indicated by the appended claims and all variations which come within the meaning of the claims are intended to be embraced therein.

I claim:

1. Sound recording and playback photographic apparatus for driving and guiding a strip of photographic film along a given path, said apparatus comprising:
   a first roller for guiding said film strip along at least a portion of said given path, said first roller being mounted for free rotation about its axis and configured to engage said film strip at only the outer edges of one side of said film strip, said first roller including a central recessed hub portion, a pair of circular end portions and a pair of flanges formed about said central recessed hub portion proximate said pair of circular end portions, whereby the central portion of said one side of said film strip is free from engagement with said film roller;
   a second roller mounted for selective displacement from a position spaced from said film strip into a position wherein it engages said film strip and presses said film strip against said first roller, said second roller being configured with a width substantially equal to the width of said film strip, said drive roller engaging said film strip along the outer portions of the other side of said film strip and being free from engagement with any portion of said first roller; and
   means disassociated from said first roller for driving said second roller to cause said film strip to be drawn between said first and second rollers.

2. The sound recording and playback photographic apparatus of claim 1 in which said recessed hub portion has a width less than the width of said film strip, said pair of flanges being separated a distance substantially equal to the width of said film strip for providing support for said film strip at the outer edges of said one side when said film strip engages said first roller, said central recessed hub portion of said first roller being configured so as to form an air space between said one side of said film strip and said first roller when said film strip engages said first roller, the central portion of said one side being free from engagement with said first roller.

* * * * *